United States Patent
Szucs (10) Patent No.: US 8,330,598 B2
(45) Date of Patent: Dec. 11, 2012

(54) AGGREGATED USER PRESENCE MANAGEMENT METHOD WITHIN A HOME NETWORK AND DEVICE FOR USER PRESENCE MANAGEMENT WITHIN A HOME NETWORK

(75) Inventor: Paul Szucs, Esslingen-Berkheim (DE)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 12/542,195

(22) Filed: Aug. 17, 2009

(65) Prior Publication Data

US 2010/0052901 A1 Mar. 4, 2010

(30) Foreign Application Priority Data

Sep. 4, 2008 (EP) .................................... 08163663

(51) Int. Cl.
*G08B 21/00* (2006.01)
(52) U.S. Cl. .................... 340/540; 340/686.1; 340/686.6
(58) Field of Classification Search .................. 340/540, 340/686.1, 686.6, 573.4, 539.11, 5.7, 5.1, 340/600; 370/338, 395.2, 401, 503; 709/217; 455/41.3
See application file for complete search history.

(56) References Cited

U.S. PATENT DOCUMENTS

| | | | |
|---|---|---|---|
| 2006/0128364 | A1 | 6/2006 | Costa-Requena et al. |
| 2006/0242304 | A1* | 10/2006 | Hirose et al. .................. 709/227 |
| 2007/0049255 | A1* | 3/2007 | Bhakta et al. ............. 455/412.2 |
| 2007/0064672 | A1 | 3/2007 | Raghav et al. |
| 2007/0177580 | A1 | 8/2007 | Ragona et al. |
| 2007/0291761 | A1 | 12/2007 | Kauniskangas et al. |

FOREIGN PATENT DOCUMENTS

WO WO 2008/085207 A2 7/2008

OTHER PUBLICATIONS

Stefan Berger et al., "Topics in In-Home Networking—Ubiquitous Computing in Home Networks", IEEE Communications Magazine, vol. 41, No. 11, Nov. 2003, pp. 128-135, XP011103285.
Wenyu Jiang et al., "Towards Junking the PBX: Deploying IP Telephony", Proceedings of the 11th International Workshop on Network and Operating Systems Support for Digital Audio and Video, Jun. 25, 2001, pp. 177-185, XP001134307.
Ron Shacham et al., "Composition for Enhanced SIP Presence", IEEE Symposium on Computers and Communications, Jul. 2007, pp. 203-210, XP031159749.
Henning Schulzrinne, "The SIMPLE Presence and Event Architecture", Communication System Software and Middleware, Jan. 2006, 9 pages, XP010932382.

* cited by examiner

*Primary Examiner* — Anh V La
(74) *Attorney, Agent, or Firm* — Oblon, Spivak, McClelland, Maier & Neustadt, L.L.P.

(57) ABSTRACT

The present invention relates to a presence management method within home network. The presence of one or more users at one or more devices within a home network is determined and the determined presence information for the one or more users is stored. If data from a remote server having a specific recipient are received, then it is determined which of the one or more users corresponds to the recipient and the received data are sent in accordance with the stored presence information to at least one device within the home network for which the presence of the one or more users corresponding to the recipient has been stored. The present invention further relates to a presence management device for managing presence information within a home network.

15 Claims, 5 Drawing Sheets

AGGREGATED USER PRESENCE MANAGEMENT METHOD WITHIN A HOME NETWORK AND DEVICE FOR USER PRESENCE MANAGEMENT WITHIN A HOME NETWORK

BACKGROUND

1. Field of the Disclosure

The present invention relates to a method and device for managing presence information within a home network. Specifically, the present invention relates to the field of delivering services to devices within a home network depending on user presence.

2. Description of Related Art

In present computer and telecommunications networks the concept of presence information is becoming increasingly important. Presence information is a status indicator that conveys ability and/or willingness of a potential communication partner to communicate. Usually, for enabling the communication a client is installed on the communication device of the user. This user client provides presence information via a network connection to a server or generally a service provider supervising the communication, which then is stored and can be made available for distribution to other users. Presence information has wide application in many communication services, i.e. instant messaging or voice over IP.

The current Skype™ implementation of a voice over IP application on a client device provides a good example of what is possible in the field of presence management. The application knows that a user is present—for example, he is on a call or participating in chat. Further the application is aware that the user is not there e.g. when the PC is powered down, but also when the screen saver kicks in or a after a time out of a predetermined period of inactivity.

A user client may publish a present state to indicate the current communication status of the user, i.e. whether he is available or willing to communicate. The most common use of presence today is to display an indicator icon on instant messaging clients, together with a corresponding text description of each state, or of the users availability, such as 'on-hook', 'off-hook', 'free for chat', 'busy', 'away' or 'do not disturb'.

In case that a user is logged into more than one device, then the Skype™ server or generally the communication server application will determine that a user is logged into two separate clients and has to handle communication with the two clients separately.

The disadvantage of the state of art is therefore, that it is resource consuming for the server or service provider to handle communication with each client device of the user separately.

SUMMARY

It is therefore the object of the present invention to reduce the disadvantages of the prior art. Specifically, it is an object of the present invention to provide a presence management method and a presence management device enhancing the accuracy of user presence information among connected devices in the home network by managing aggregated user presence information in an improved way. It is a further object of the present invention to reduce the data processed by the communication server, thereby making the communication faster and more reliable.

This object is addressed by a presence management method according to claim 1 and by a presence management device according to claim 14.

The present invention relates to a presence management method within home network, comprising the steps of determining presence of one or more users at one or more devices within a home network, storing the determined presence information for the one or more users, receiving data from a remote server having a specific recipient, determining which of the one or more users corresponds to said recipient and sending in accordance with the stored presence information the received data to at least one device within the home network for which the presence of the one or more users corresponding to said recipient has been stored.

The present invention further relates to a presence management device for managing presence information within a home network, comprising at least one device interface for communicating with one or more devices within a home network, a processing unit for determining presence of one or more users at one or more devices within said home network, a database for storing the determined presence information for the one or more users, a server interface for communicating with a remote server and for receiving data from a remote server having a specific recipient, wherein the processing unit is adapted determine which of the one or more users corresponds to said recipient and to send in accordance with the stored presence information the received data to at least one device within the home network for which the presence of the one or more users corresponding to said recipient has been stored.

Advantageous features and embodiments are subject matter of the dependent claims.

BRIEF DESCRIPTION OF THE DRAWINGS

The present invention will now be explained in more detail in the following description of preferred embodiments in relation to the enclosed drawings in which.

DESCRIPTION OF THE EMBODIMENTS

Figure 1:
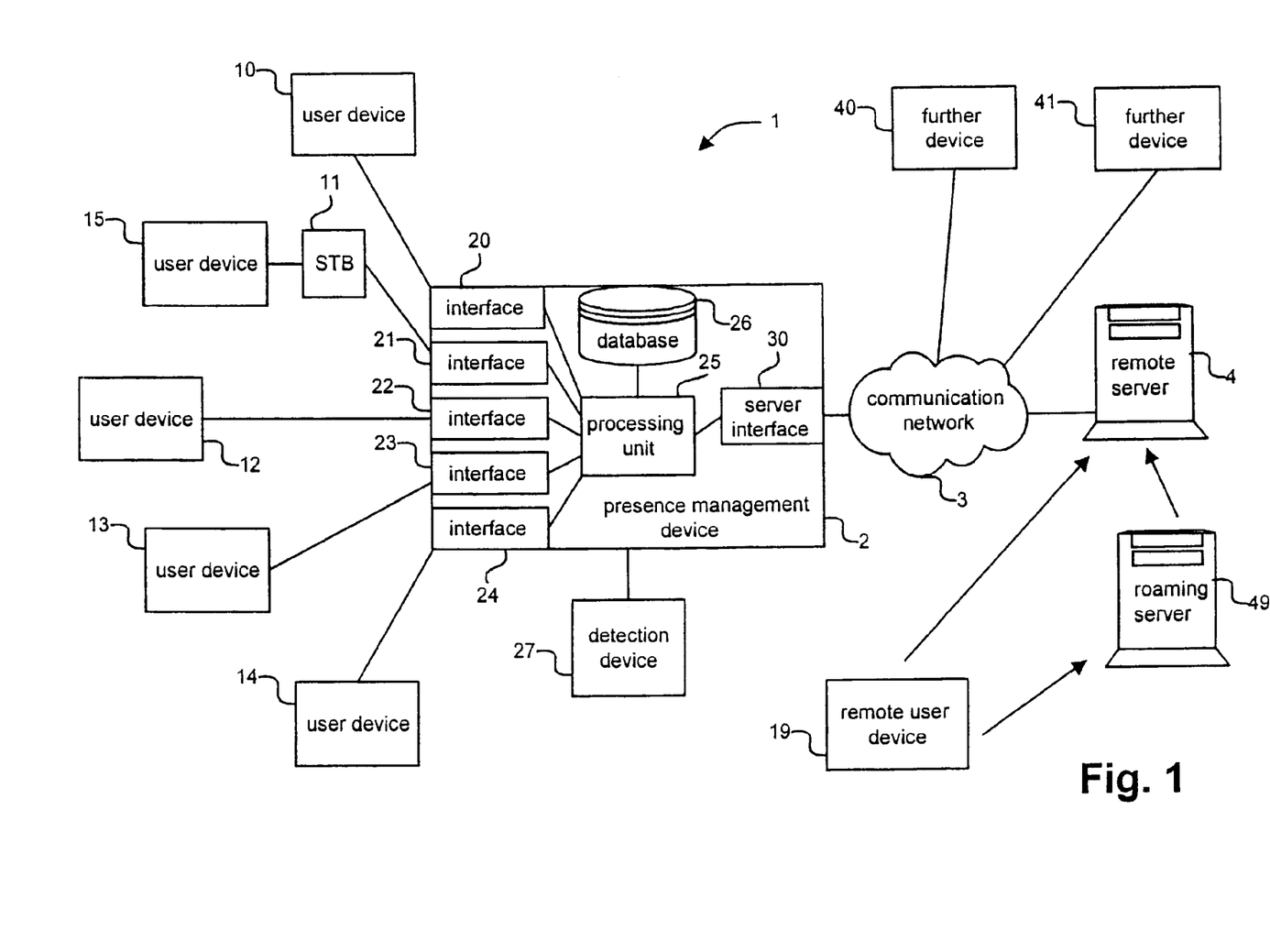
FIG. 1 shows a schematic block diagram of a system comprising a presence management device within a home network according to the present invention.

FIG. 1 shows a schematic block diagram of a system comprising a presence management device 2 according to the present invention. In FIG. 1 a home network 1 is shown comprising a plurality of user devices 10, 12, 13, 14, 15 and a presence management device 2. In the example of the present invention the home network 1 comprises five devices 10, 12, 13, 14, 15 but the present invention can be adapted to any home network comprising less or more user devices. Devices can for example be a networked high definition television HDTV, a set top box STB, a standard definition television SDTV, a personal computer PC, a Personal Digital Assistant PDA, a networked gaming console, such as for example a PlayStation™, a mobile phone enabling wireless communication, a laptop computer, a hand-held device or any other user device enabling any type of communication. In the present example, four devices 10, 12, 13, 14 are directly connected to the presence management device 2 performing presence management. A further device 15, which may for example be a HDTV, is connected by a further device 11, which may for example be a set top box, also to the presence management device 2, in this case communication between the device 15 and the presence management device 2 will be accomplished via the further device 11.

The presence management device 2 comprises several device interfaces 20, 21, 22, 23, 24 enabling a communication with the user devices 10, 15, 12, 13, 14. Hereby, the presence management device 2 may comprise one or more device interfaces each being adapted to communicate with one, a plurality or all of the user devices 10, 12, 13, 14, 15. That means that some or all of the device interfaces 20, 21, 22, 23, 24 can be incorporated into a single device interface, but in any case the presence management device 2 via the device interfaces 20, 21, 22, 23, 24 is enabled to communicate separately with each of the user devices 10, 15, 13, 14.

The presence management device 2 further comprises a server interface 30 enabling the communication of the presence management device 2 with a remote server 4 via an arbitrary communication network 3. The term "remote server" according to the present invention is intended to refer one or more servers and/or computers and generally to a service provider. The communication network 3 can be a wired or wireless communication network, specifically the communication network 3 can be the internet, an intranet, a wireless communication system or any other present or future communication network.

The remote server 4 provides several applications and/or communication possibilities and is linked to further user devices and/or servers.

Further, according to the present invention it is possible that a remote device 19 can remotely connect to the home network 1, thereby representing a virtual presence within the home network 1 as will be explained later on.

The user when accessing one of the user devices 10, 15, 12, 13, 14 is enabled to communicate with the remote server 4 via the presence management device 2 and to use any services or applications offered by the remote server 4, such as text or multimedia messaging, text-based chatting, voice over IP, video calls, receiving television services, e.g. IPTV, downloading data, programs and/or applications or any other type of communication.

The presence management device 2 herefore can be implemented as a router, gateway or a device combining the functionalities of router and gateway together with possible other functionalities.

The presence management device 2 further comprises a database 25 for storing data and/or information. Specifically, the presence management device 2 is adapted to determine which user is present at which device 10, 15, 12, 13, 14 and to store the user presence information in the database 25. The presence management device 2 further comprises a processing unit 26 being connected to and in data communication with the device interfaces 20, 21, 22, 23, 24, the server interface 30 and the database 25. The processing unit 26 controls and supervises the functionalities and processing of the presence management device 2.

The system additionally comprises further user devices 40, 41, which are in direct communication with the remote server 4, e.g. using the communication network 3 or any other communication line, and which are not part of the home network 1, i.e. which are not communicating with the remote server 4 via the presence management device 2. The further user devices 40, 41 may also be accessing one or more services, programs and/or applications offered by the remote server 4. The further user devices 40, 41 may also use any type of communication enabled by the remote server 4 thereby communicating with one or more of the user devices 10, 15, 12, 13, 14 within the home network 1.

According to an embodiment of the present invention the presence management device 2 is adapted to detect the presence of one or more users at one or more devices 10, 15, 12, 13, 14 within the home network 1 and also to detect the virtual user presence of a user using a remote device 19, to store the determined user presence information in the database 25 and upon reception of data from the remote server 4 to determine which user is intended as recipient for the received data and then to route in accordance with the stored presence information the received data to at least one device 10, 15, 12, 13, 14, 19 within the home network 1 for which the presence of the one or more users corresponding to said recipient has been stored.

That means that the remote server only communicates with the presence management device 2 but does not communicate directly with the devices 10, 15, 12, 13, 14 within the home network 1. The communication with the several devices is accomplished by the presence management device 2. Further, the communication and/or the routing of data between the devices 10, 11, 12, 13, 14, 15, 19 and the remote server 4 is based on determined user presence information.

According to an embodiment of the present invention it is proposed to unicast from the remote server 4 to the presence management device 2 and then to multicast from the presence management device 2 to at least one of the devices 10, 15, 12, 13, 14 for which the user presence of the recipient user has been determined. This has the advantage that the data transfer handled by the remote server 4 is reduced, since the remote server 4 only has to communicate with the presence management device 2, which aggregates and manages user presence information. Further, since the presence management device 2 transmits the received data only to devices at which the intended user is present, the data transfer within the home network 1 is also reduced. An unnecessary usage of transmission capacities is thereby avoided.

Every user having access to and using one or more devices 10, 15, 12, 13, 14 has a user identification ID uniquely identifying the respective user. The user ID can hereby correspond to the first name of the user or may be any other user ID associated to one user and adapted to uniquely identify the user. Additionally, a further user ID for example called "guest" may be provided enabling a temporary user to use the devices 10, 15, 12, 13, 14 within the home network 1. Usually, every user when logging into a device will use his own user ID which identifies him at the respective device 10, 15, 12, 13, 14. For example, a personal computer 13 within the home network 1 may have stored thereon several user profiles for several users using the PC 13 so that a user for getting access to the PC has to choose his own user profile by logging into the PC 13 with his own user ID and possibly with a password. The presence management device 2 stores the relationship between the user ID and the used device as presence information in the database 25. The user when accessing via the presence management device 2 an application or service offered by the remote server 4 will submit his user ID to the remote server 4.

Alternatively, the user may want to use an alias instead of submitting his user ID to the remote server 4. An alias can be an icon and/or an arbitrary sequence of symbols, such as letters, numbers or the like. In this case the user will log in with his user ID into the device 10, 15, 12, 13, 14 and then also use an alias for communicating with the remote server 4. In this case the presence management device 2 will store in the database 25 not only the user ID and the device at which the user is currently present, but will also store the corresponding alias which the user is presently using for accessing applications or services provided by the remote server 4. Alternatively, the user can directly log into the device 10, 15, 12, 13, 14 with an alias, in this case the relationship between the alias and the user ID is already stored in the database 25. In some embodiments every user has a single user ID uniquely identifying him and optionally can have one or more aliases he can use when accessing different services offered by the remote server 4.

Further, it may happen that a user uses a user device 10, 15, 12, 13, 14 without the need to log in. For example, a user may switch on the standard definition television SDTV 14 and use the SDTV 14 without inputting his user ID. In this case the presence management device 2 can determine possible users using said device, i.e. can make an estimation of users which could be using said device based on predefined parameters.

It is to be noted that user presence information for a device 10, 15, 12, 13, 14 is stored in the database 25 only depending on the detected presence of the user and irrespective of the user accessing the remote server 4 and/or using a service offered by the remote server 4 or not.

One advantage of the present invention is that rather than each of the user's devices 10, 11, 12, 13, 14, 15 in his home or a remote device 19 at another location each interacting individually with one or more remote servers 4, providing communication or presence services, the presence management device 2 manages the user's presence and communication capability locally within the home network 1, and only the presence management device interacts with the one or more remote servers 4 which are reachable via the communication network 3.

A further advantage of the present invention is that the presence management device 2 can aggregate the presence information and manage the aggregated presence information in an efficient and intelligent way. Aggregation hereby means acquiring the presence information and possibly additional information related to the user, the presence status and/or the devices. The aggregation can also comprise the step of making at least a part of the aggregated presence information available to other devices, e.g. to one or more of the user devices 10, 11, 12, 13, 14, 15, 19 and/or to the remote server 4.

Aggregation of the presence information can hereby be used at the user level, i.e. the presence information can be prepared and communicated to one or more users within the home network 1 including the user of the remote user device 19.

Alternatively or additionally the presence information can also be used at the device level. In this case the presence management device 2 knows and monitors the presence information indication whether a user is logged into a device or using a device. Possibly the presence management device 2 may also know and monitor the presence status, which might be different at each user device 10, 11, 12, 13, 14, 15, 19, e.g. one device may have gone into screen saver mode, so the presence status of the user is that he is not physically present at this device even though he is still logged in. The same user at the same time might be using another device currently accessing a service of the remote server 4, so that the presence status of the user at this other device is that he is physically present. At the same time a further device might be switched on where for example by use of the detection device 27 it is also detected that the user is not physically present. That means that the presence status in addition to the presence information indicates, whether the user is physically present at a device.

The presence management device 2 can aggregate the presence information and optionally the presence status thereby enabling an effective and intelligent handling of presence information.

The present invention can be applied to such aggregation and managing of existing presence and communication systems and protocols such as Session Initiation Protocol SIP and Session Description Protocol SDP, Extensible Messaging and Presence Protocol XMPP, or any other suitable system or protocol.

The aggregation and managing of presence information of a particular user can involve also the step of determining by which of a defined set of methods the user would be able to communicate by using a respective device 10, 11, 12, 13, 14, 15, 19. These could be on or more of the following possibilities: Text-based communication like text messaging, user-to-user chat sessions, or text-based forum discussions, audio content reception, bi-directional voice communications, video content reception, bi-directional visual communications.

Thus, as well as the presence information itself, the available methods of communicating with the user can also be known and stored by the presence management device 2, and aggregated by the presence management device 2 for the communication service provider. When a communication service connection is requested by another user via the remote server 4, the presence management device 2 may route the connection request only to the devices 10, 11, 12, 13, 14, 15, 19 able to accommodate the type of connection requested, based on the current presence information of the user determined to be the recipient.

As is already known from the IMS, negotiation with the remote party about the type of connection can be performed before the connection is set up. In order to offer the user the most flexibility with the connection, the presence management device 2 according to the present invention can offer alternative connection set-ups to the user. For example, if the user is currently not present at the TV device and no other is present there, the user can be offered to take a video call at the TV device by first accepting the call at his handheld device (which is not able to receive a video call).

A further embodiment of the present invention is to enable the bridging of local home network presence management and notification protocols (e.g. based on DLNA, UPnP), or proprietary presence protocols, to an open standards based presence management protocol used in managed communication services, like the protocols adopted in the Internet Multimedia Subsystem (IMS) or XMPP, for example. Here the presence management device 2 is able to use the local home network presence management protocol or the proprietary protocol to communicate with user devices connected in the home network. The presence routing device translates in both directions between the local home network presence management protocol or the proprietary protocol and the communication service presence protocol, e.g. based on SIP and SDP.

Figure 7:
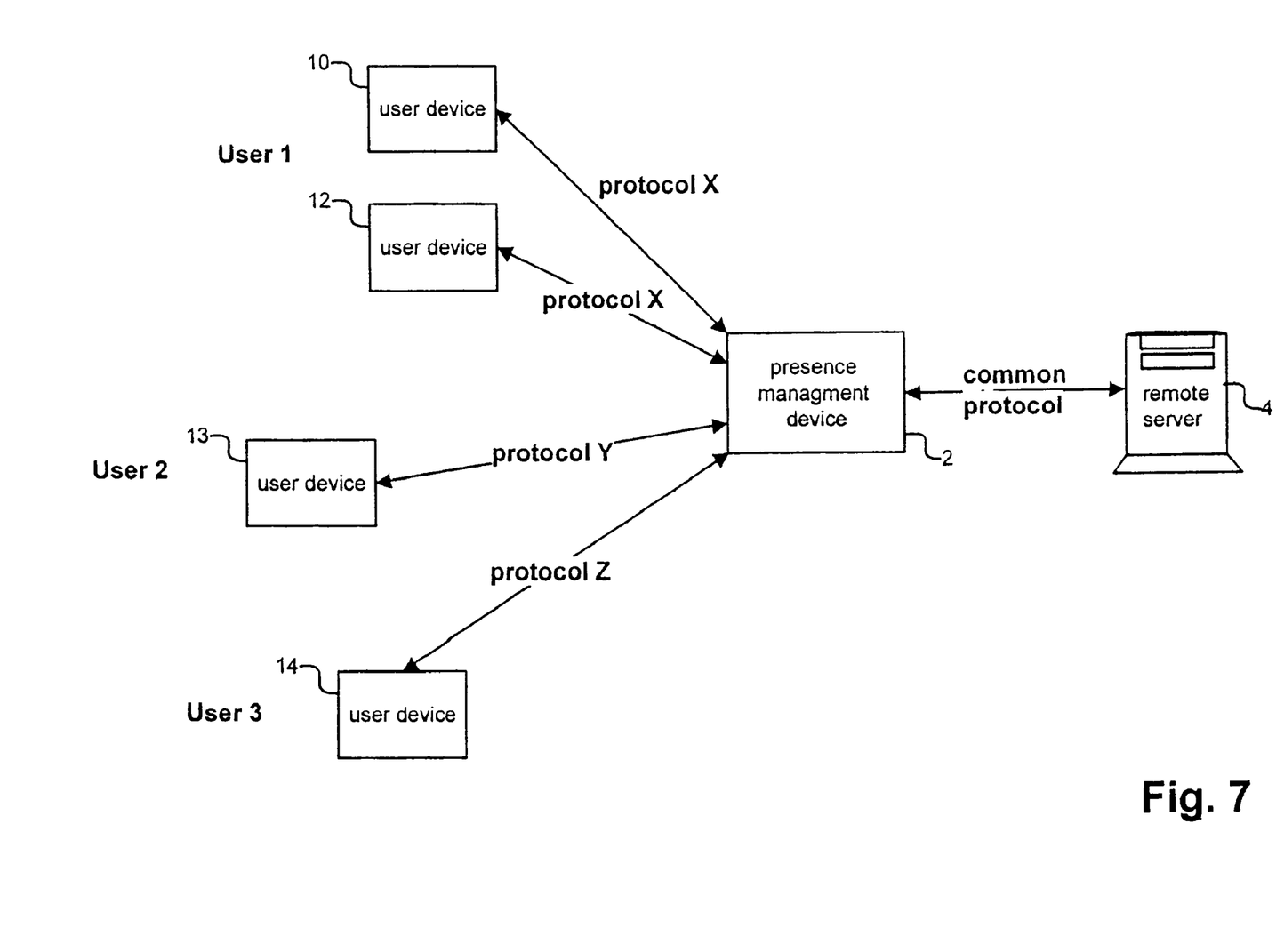
FIG. 7 is a schematic block diagram showing one embodiment of a system comprising a presence management device according to the present invention and FIG. 8 is a diagram showing the components and steps referring to the embodiment of a virtual presence within the home network according to the present invention.

An example for such a bridging between different communication protocols is shown in FIG. 7. A first user uses two user devices 10, 12 for communicating via the presence management device 2 with the remote server 4. Likewise, a second and third user use respective user device 13, 14 for communicating via the presence management device 2 with the remote server 4. The communication in the present example, which is not intended to limit the present invention to the shown example, the first user communicates with the presence management device 2 using first proprietary communication protocol X, the second user communicates with the presence management device 2 using second proprietary communication protocol Y and the third user communicates with the presence management device 2 using third proprietary communication protocol Z. The communication between the presence management device 2 and the remote server 4 on the other hand is accomplished via a common protocol and the presence management device in addition to the management and optionally aggregation of presence information accomplishes a bi-directional translation between the different communication protocols. Each of the proprietary protocols carries the respective presence information of the different users at the different devices and in case the presence management device 2 makes these presence information available to the remote server 4, then the presence management device will adapt the presence information accordingly in order to transmit it via the common protocol.

Figure 2:
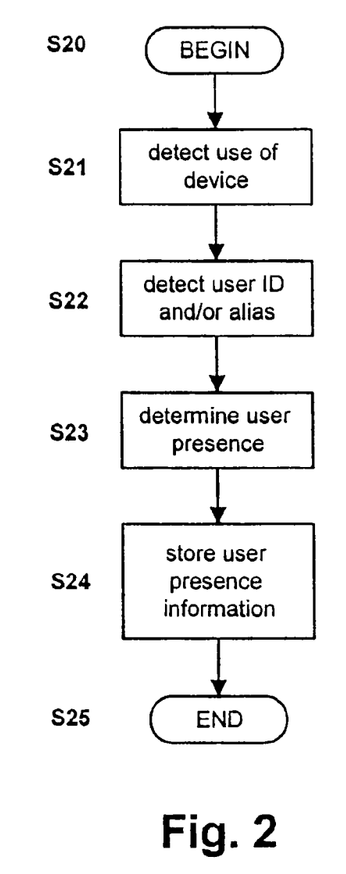
FIG. 2 is a flow chart showing the process steps of determining user presence based on a user ID and/or alias according to the present invention.

With reference to FIG. 2 now a first process for determining presence of a user will be explained. The process starts in step S20, i.e. with a user logging into one of the user devices 10, 15, 12, 13, 14 requiring a log in or logging into the home network 1 by the remote device 19. In step S21 the presence management device 2 or a Near Field Communication device such as Felica™ or MiFare™ will detect the use of the respective device. In the following step S22 the presence management device 2, i.e. the processing unit 26 of the presence management device 2 will detect the input user ID used for log in and possibly an alias input by the user for communicating with the remote server 4 or for simply using the respective device 10, 11, 12, 13, 14, 15, 19 without accessing services offered by the remote server 4.

In the next step S23 then dependent on the input user ID the respective user is determined to be present at said specific device and in the next step S24 the user presence information is stored in the database 25, i.e. the information that a specific user is present at a specific device is stored in the database 25. In case a user has used an alias then also this alias is stored in the database 25.

The process ends in step S25.

Instead of detecting the user ID when logged into a device, other methods can be adopted. The presence management device 2 may comprise or be connected to a detection device 27, which is able to wirelessly detect a user using a device 10, 11, 12, 13, 14, 15. The detection device 27 can for example comprise a camera which is able to take a picture of the user being using a device 10, 11, 12, 13, 14, 15 and to compare it with a database of user pictures in order to detect which user is presently using a specific device 10, 11, 12, 13, 14, 15. Another possibility is that the detection device 27 is adapted to detect the presence of a token, a tag or the like, e.g. an RFID tag. If every user has with him a token or tag uniquely identifying him, then the detection device 27 can detect the present of the token or tag thereby identifying the presence of a user. Also a combination of the above mentioned possibilities can be applied. In any case, the detection device 27 submits the detected user presence to the processing unit 26, so that the user presence stored in the database 25 can be created and/or updated.

Figure 3:
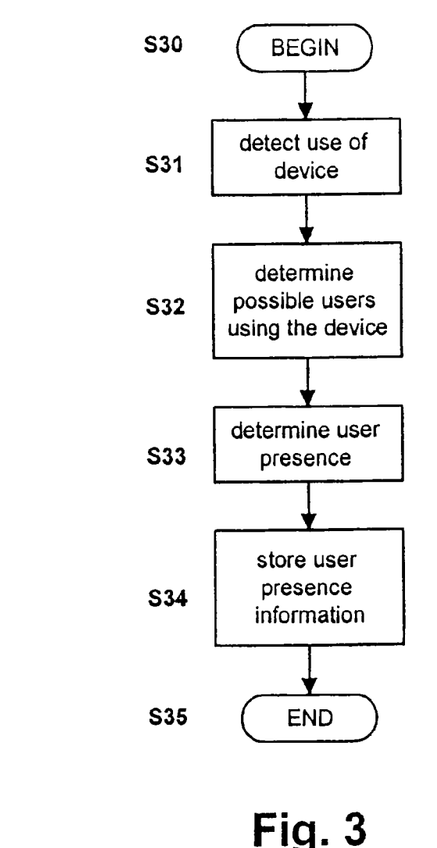
FIG. 3 is a flow chart showing the process steps of determining user presence without user ID or alias according to the present invention.

With reference to FIG. 3 now a further process for determining the user presence will be explained. This process now refers to the case that the user can use a device without having the need to log in or to the case that the user logs into a device using an alias unknown to the presence management device 2. The process begins in step S30, i.e. with the user starting the use of a device. In the next step S31 the processing unit 26 of the presence management device 2 will detect that the respective device is presently used. In the next step S32 the processing unit 26 will determine possible users using the device, i.e. the processing unit will make an estimation which users could be possibly present at the respective device. Thus the determination can be based on predefined parameters, as will be explained later on.

In the next step then depending on the previous determination or estimation one or more user are determined to be present at the device and in the next step S34 the user presence information is stored in the database 25, i.e. for the one or more users which can possibly be present at said device the relation between the respective one or more user IDs and the device is stored in the database 25.

The process ends in step S35.

As has been previously explained, a user can also log into the home network 1 by using a remote device 19. In this case the remote device 19 by the presence management device 2 is handled like a device being physically present within the home network even though the remote device 19 can be at any place.

With a conventional presence service, the remote device 19 would register the user's presence with the service provider of the remote server 4 as just one of the user's devices. However, the present invention foresees the ability of the remote device 19 to establish a private connection (like a VPN or tunnelling connection via the service provider) to the presence management device 2. This is referred to here as "virtual presence".

With virtual presence, some novel variations of applications can be provided to the user. Sometimes it is not possible e.g. due to no roaming agreement between service or access providers or not desirable e.g. due to high roaming charges to connect to the services offered at the remote server 4 of the service provider. With virtual presence, the user can access the presence management device 2 and services of the remote server 4 without connecting to the locally available service provider's server 4. When the remote device 19 connects to presence management device 2 via such a remote connection, the presence management device 2 provides particular services to the user of the remote device 19, such as access to all appropriate communication services, also the managed services, as if the user were present at home, for example access to voicemail, messaging, home automation configuration and control, home security and monitoring. Subject to the user's wish, the user presence information could be updated also as if the user was at home.

Figure 8:
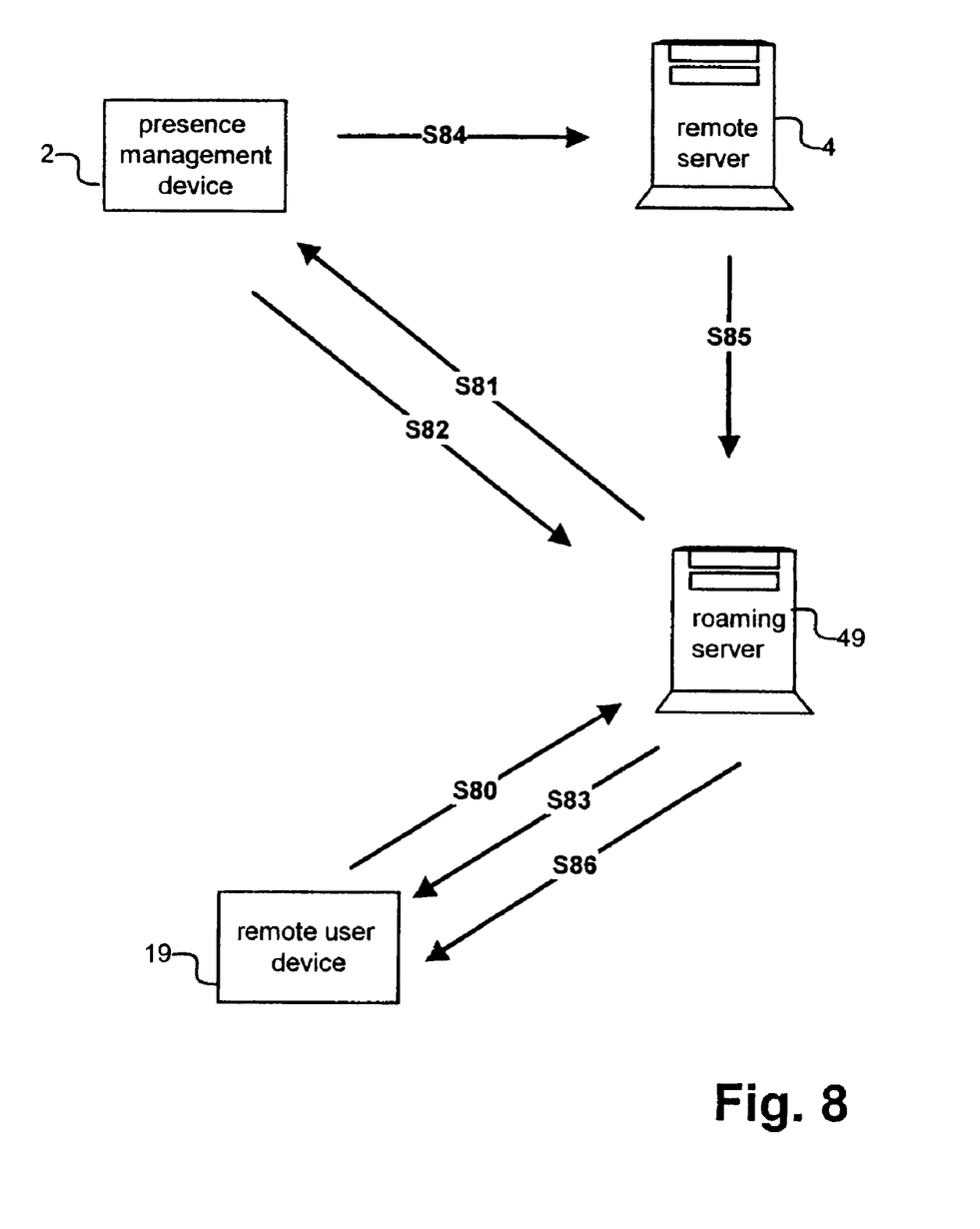

FIG. 8 is a diagram showing the components and steps referring to the embodiment of a virtual presence within the home network 1 according to the present invention. A user using a remote user device 19 not being physically present and part of the home network 1 in a first step S80 can connect to a roaming server 49. If the user now wishes to access services offered by the remote server 4 or information made available by the presence management device 2, instead of logging into the remote server 4 the user via the roaming server 49 can directly log into the presence management device and thereby log into the home network 1. Such a log in can be accomplished by a tunnelling, thereby enabling a virtual private network via the roaming server 49 to the presence management device in steps S80 and S81.

If the user now wishes to access services offered by the presence management device 2, he can do this after having logged into the presence management device 2 via the roaming server 49. For example he can receive some or all of the aggregated presence information from the presence management device 2 in steps S82 and S83 via the roaming server 49. The user by using the remote user device 19 can also access services, such as security and surveillance services within the home network 1 offered by the presence management device 2 or offered by any other device within the home network 1.

In order to access services offered by the remote server 4, the user of the remote user device 19 instead of connecting from the roaming server 49 to the remote server 4, which would be much more costly, can instead access the services of the remote server 4 via the presence management device 2. That means that the user of the remote user device 19 only has to log into the roaming server 49 and only has to pay the charges for the roaming server 49, but then can use all services offered by the presence management device including an access to the remote server 4 as if he was at home in step S84.

In case that presence management device 2 makes available the presence information of the different user devices 10, 11, 12, 13, 14, 19 to the remote server 4, then the remote server can have logic to detect whether a device which is currently accessing the remote server and requesting a service or any type of media data content is a part of the home network 1 or whether such a device only forms a virtual presence within the home network 1. In case that the remote server 4 detects that the remote user device 19 is not a part of the home network, i.e. not physically present within the home network, then the remote server 4 will send the requested services directly to the remote user device 19 via the roaming server 49 in steps S85 and S86 instead of sending the services to the presence management device 2 and to the home network 1.

The above-mentioned step of determining possible users using said device based on predefined parameters can be accomplished according to one or more of the following possibilities.

A possibility is to determine possible users based on user presence at other devices within the vicinity of said device. Herefore, in the database 25 information may be stored on the position of the devices within the home network 1. E.g. information on devices being provided in the same room can be stored and/or the distance between all devices and/or information indicating whether a device is mobile or not. If for example two devices are provided in the same room and if one user is already present at one of these devices, then it will be possible to estimate that the user is also present at the other one of the two devices within the same room. Likewise, the user can also be determined to be present at devices which are within a predefined range of the device at which the user is already present. The range can be determined using near field communication NFC, Bluetooth or any other network technology enabling the detection of a device being within a predefined range. Additionally or alternatively, mobile devices such as mobile phones, laptops or the like can be regarded to be in the vicinity of every other device within the home network 1.

According to a further possibility the possible users are determined based on information stored in the database 25 indicating the ownership of the device. If for example it is stored in the database 25, that one or more of the user devices belong to a specific user, then upon detection of use of one of these one or more devices only the one user being the owner of this device will be determined as possible user.

Of course it is possible to combine any of the above-mentioned possibilities of determining possible users.

Figure 4:
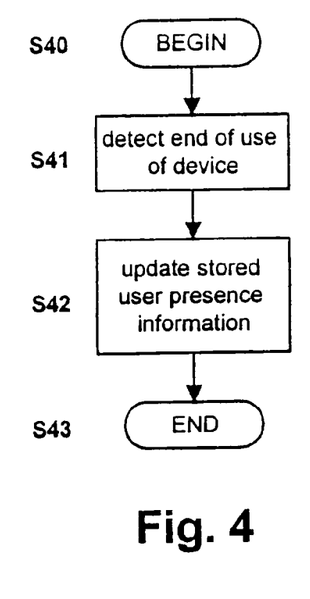
FIG. 4 is a flow chart showing the process step of detecting the termination of a user presence according to the present invention.

With reference to FIG. 4 now the process for updating the stored presence information will be explained. The process begins in step S40, i.e. with an user ending an application, or switching off a device or being absent for a longer time. In the next step S41 the presence management device 2 will then detect the end of use of the device. In the next step S42 the user presence information stored in the database 25 will then be updated by deleting the user presence information in relation to said device, i.e. by deleting the stored relationship between the user ID and the device from the list. The process ends in step S43.

Figure 5:
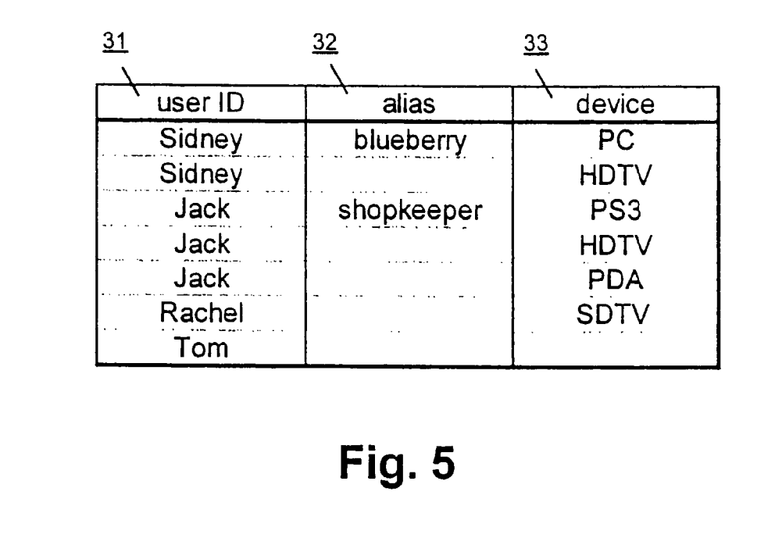
FIG. 5 shows an embodiment of a database storing user presence information according to the present invention.

FIG. 5 shows a possible list as stored in the database 25 of the presence management device 2. Additionally, also other information may be stored in the database 25 as previously explained, e.g. ownerships of devices 10, 12, 13, 14, 15.

In a first column 31 the user IDs of the persons using and accessing the devices 10, 15, 12, 13, 14 are stored. In the present example, the user IDs correspond to the first names of the persons using the devices, but as it has previously explained any other type of user ID can be used. In the present example, four persons are stored which access the devices 10, 15, 12, 13, 14 and which can possibly connect to the home network using the remote device 19.

In a second column 32 the aliases used by the users when accessing the remote server 4 are stored. As it has been previously explained, the use of an alias is not mandatory. In a third column 33 the different devices are stored, so that in each line a relationship is stored between a user ID and a device and optionally also a correlation between the user ID, the device and the alias.

The table as shown in FIG. 5 may have been generated according to the following different processes. Assume that only as an example four persons stored in the database 25.

Sidney has for example logged into the PC and uses a chat service provided by the remote server 4 thereby using her alias blueberry. The presence management device 2 will then detect the log in of Sidney at the PC and store the corresponding user ID "Sidney", the alias "blueberry" and the device. "PC" as shown in FIG. 5. Likewise, Jack may have logged into the PlayStation™ PS3 using his user ID and the alias shopkeeper. Additionally, Jack has logged into his PDA using his user ID. The respective assignments are stored in the table shown in FIG. 5.

If now for example the presence management device 2 detects that the standard definition television SDTV is used and since for watching TV no user ID will have to be input, the presence management device 2 will estimate the possible users using the SDTV. In the present example it might be possible that information has been input into the database 25 and stored therein that the SDTV belongs to Rachel. In this case the presence management device 2 will determine as single possible user of the SDTV Rachel and store the corresponding user presence information in the database 25 in the table as shown in FIG. 5.

Now, if additionally the HDTV is switched on, then the presence management device 2 again will estimate the possible users using the HDTV. If for example via the above mentioned technologies it is determined that the PC, the PS3 and the PDA are in vicinity of the HDTV, then the presence management device 2 will determine Sidney and Jack as possible users of the HDTV and store them in the associated database 25.

It is to be noted that above processing for generating the table according to FIG. 5 is only one single example for explaining the processes carried out by the presence management device 2 and that any of the above explained processes and/or of the processes explained with reference to FIGS. 2, 3 and 4 can be used alone or in any possible combination and in any possible order.

Figure 6:
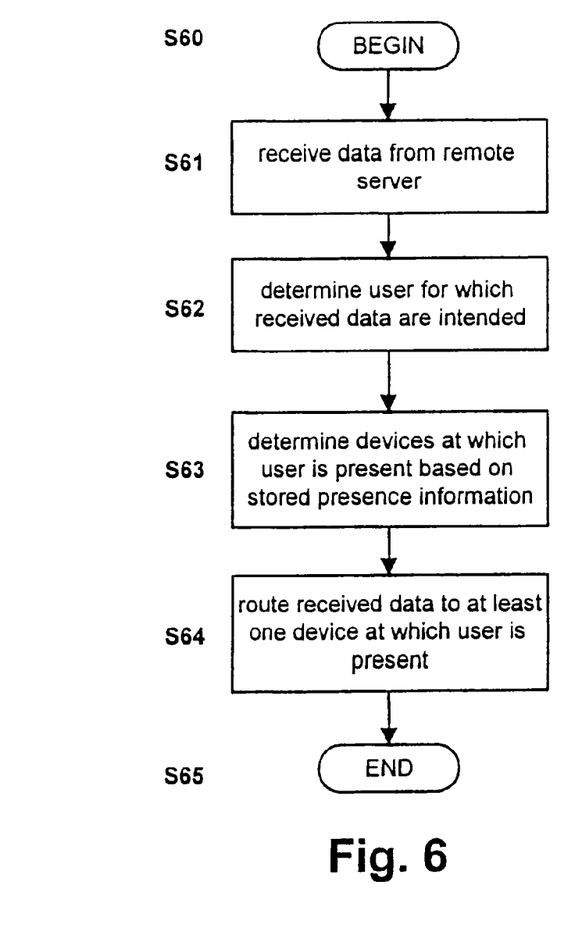
FIG. 6 is a flow chart showing the process steps of presence based routing according to the present invention.

With reference to FIG. 6 now the method of routing incoming data to the user being defined as recipient based on the aggregated user presence information will be explained.

The process begins in step S60. In step S61 the presence management device 2 via the server interface 30 and over the communication network 3 receives data from the remote server 4. These data may be a message, an e-mail, a call, i.e. voice over IP, a television program, or any other data, program or application. These data are transmitted from the remote server 4 comprising information on an intended recipient. The term recipient when used in the present specification intends to refer to the addressee of the received data, i.e. in the present application to an user ID or an alias used by the user when accessing the service offered by the remote server 4.

The processing unit 26 in the next step S62 will determine the user which corresponds to the specified recipient. If the user is presently accessing the remote server 4 with his user ID, then the recipient will correspond to the user ID. Otherwise, if the user is accessing the remote server using an alias, then the recipient will correspond to the alias and the processing unit 26 of the presence management device 2 based on the stored correlation of alias and user ID will determine the corresponding user. After having determined the user for which the received data are intended then in the next step S63 the devices 10, 12, 13, 14, 15, 19 at which the user is present based on the stored presence information are determined.

In the next step S64 the received data via the device interfaces 20, 21, 22, 23, 24 are routed, i.e. sent to at least one device at which the user is present. Hereby, the presence management device 2 can send the received data to all devices at which the user is present or only to one or a selection of the devices at which the user is present. This can also be based on predefined parameters.

For example, the settings in the presence management device 2 may provide that in case the user is using an alias the received data are routed only to the one or the several devices at which the respective user is presently using this alias. Another possibility would be to route the data only to those devices, for which the presence of the user has been unambiguously determined, i.e. into which the user logged in using his user ID and/or his alias. For example in case of devices to which a user does not have to log in with his user ID or alias, the presence of a user cannot be unambiguously determined. In order to secure a privacy, the presence management device 2 therefore can route the incoming data only to those devices for which the user presence is unambiguously determined.

Another possibility is as already explained that the presence management device 2 routes the received data to all devices at which user presence information is stored irrespective of being unambiguously determined or not.

Referring again to FIG. 6 the process ends in step S65.

The invention claimed is:

1. A presence management method for a presence management device within home network, comprising:
   determining a presence of one or more users at one or more devices within a home network;
   storing the determined presence information for the one or more users;
   receiving data from a remote server having a specific recipient;
   determining which of the one or more users corresponds to said specific recipient; and
   sending, in accordance with the stored presence information, the received data to at least one device within the home network for which the presence of the one or more users corresponding to said specific recipient has been stored.

2. The method according to claim 1, comprising:
   detecting use of a device; and
   determining the presence of a user based on a user identification ID uniquely identifying each user and/or based on an alias of the user at said device.

3. The method according to claim 1, comprising:
   detecting use of a device and determining possible users using said device based on predefined parameters; and
   determining the possible users based on user presence at other devices within the vicinity of said device.

4. The method according to claim 1, comprising:
   wirelessly detecting presence of a token associated to one user and thereupon determining a presence of a user at a device.

5. The method according to claim 1, comprising:
   detecting an end of use of a device by a user; and
   updating the stored user presence information by deleting the user presence information in relation to said device.

6. The method according to claim 1, wherein said step of storing user presence information includes storing the relation between a user identification ID uniquely identifying each user and one or more devices at which said user is determined to be present and where the user is using an alias at one or more devices storing the relation between the alias, the user ID and the one or more devices.

7. The method according to claim 6, wherein said step of determining which user corresponds to said specific recipient includes
   determining, as the user corresponding to said specific recipient, a user whose user ID and/or alias is identical to said specific recipient.

8. The method according to claim 6 or 7, comprising:
   sending the received data to one or more of the devices at which the user is present using the user ID and/or an alias.

9. The method according to claim 1, comprising:
   sending the received data to all devices for which user presence of the user corresponding to the specific recipient is stored.

10. The method according to claim 1, comprising:
    storing communication capabilities of each device and sending the received data only to those devices which are capable of handling the received data type.

11. The method according to claim 1, comprising:
    receiving input by the user indicating a device to which the received data should be sent and sending the received data to the indicated device.

12. The method according to claim 1, comprising:
    determining and storing in addition to the presence information, a presence status of the one or more users at each user device, said presence status indicating whether a user is physically present at said one or more user device.

13. The method according to claim 1, comprising:
    aggregating the presence information and making the aggregated presence information available to at least one of the user devices and/or to the remote server.

14. A presence management device for managing presence information within a home network, comprising:
    at least one device interface to communicate with one or more devices within a home network;

a processing unit to determine presence of one or more users at one or more devices within said home network;

a database to store the determined presence information for the one or more users; and a server interface to communicate with a remote server and to receive data from a remote server having a specific recipient, wherein the processing unit is configured to determine which of the one or more users corresponds to said specific recipient and to send, in accordance with the stored presence information, the received data to at least one device within the home network for which the presence of the one or more users corresponding to said specific recipient has been stored.

15. A non-transitory computer-readable medium encoded with computer-readable instructions thereon, the computer-readable instructions when executed by a presence management device causes the presence management device to perform a method comprising:

determining presence of one or more users at one or more devices within a home network;

storing the determined presence information for the one or more users;

receiving data from a remote server having a specific recipient;

determining which of the one or more users corresponds to said specific recipient; and sending in accordance with the stored presence information the received data to at least one device within the home network for which the presence of the one or more users corresponding to said specific recipient has been stored.

* * * * *